A. J. Spicer.
Prairie Plow Jointer.
N°. 111,786.      Patented Feb. 14, 1871.
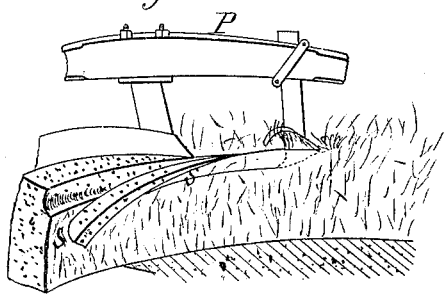
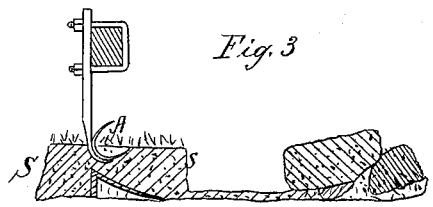
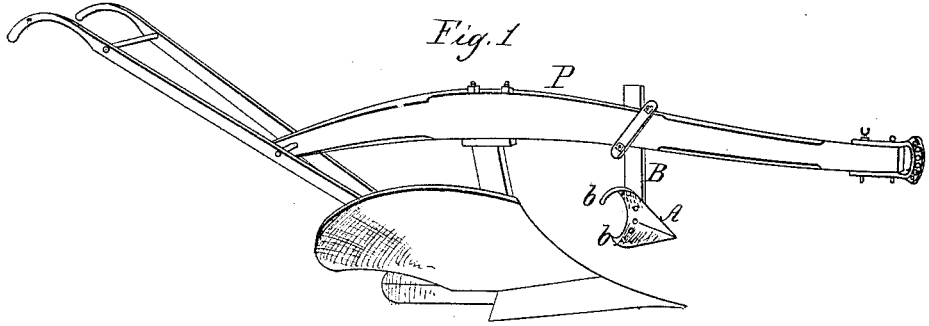
Witnesses
Frank Little
R. F. Judson
Inventor
Andrew J. Spicer

UNITED STATES PATENT OFFICE.

ANDREW J. SPICER, OF GALESBURG, MICHIGAN.

IMPROVEMENT IN PRAIRIE-PLOW JOINTERS.

Specification forming part of Letters Patent No. 111,786, dated February 14, 1871.

*To all whom it may concern:*

Be it known that I, ANDREW J. SPICER, of Galesburg, in the county of Kalamazoo and State of Michigan, have invented a new and useful Prairie-Plow Jointer; and I do hereby declare that the following is a full, clear, and exact description thereof, reference being had to the accompanying drawings, making part of this specification.

Figure 1 is a perspective view of plow with jointer A attached. Fig. 2 is a side view, showing a section of sod turning over. Fig. 3 is a transverse section through jointer, rear view.

The nature of my invention consists, substantially, in attaching to the colter-standard of a plow a heart-shaped steel colter and jointer, the wing or section of said heart-shaped colter and jointer lying next to said colter-standard and curved outwardly at its upper extremity, acting as a colter, while the other wing or section of the same, lying horizontally to and nearly at right angles with the wing acting as colter, and being curved upwardly, acts as a jointer, the said outward curve at the extremity of the wing or section used as a colter acting so as to throw the sod cut by the colter outwardly, and thus prevent the clogging of the colter and plow. At the same time the curve upwardly of the wing or section acting as a jointer serves to cut the sod, so that it slips over and is left immediately behind the jointer in the same position as before cutting, and ready for the plowshare, which follows, to turn completely over.

The invention has for its object the cutting of sod-ground in plowing, so as to prevent the clogging of the colter and plow; also, to prevent the usual side draft attending the use of jointers; and, further, to leave the sod in the same position as before cutting, so that the plow, in following the jointer, turns the sod completely over and leaves the plowed field perfectly smooth, with no clods to be caught by the harrow.

To enable others skilled in the art to make and use my invention, I will describe its construction and operation.

The colter and jointer A, Fig. 1, is attached to the colter-standard B by rivets with heads countersunk in the colter-standard, the lower end of which colter-standard is bent to conform to the shape of the colter and jointer. The wing $b$, which acts as a colter, is curved outwardly at its lateral extremity and away from the colter-standard, to prevent clogging when in use. The wing $b$, which acts as a jointer, is curved upward at its lateral extremity to cut the sod clear from the main land.

Fig. 2 shows the position of the jointer A in relation to the plow P, and also its position in reference to a section of the sod S S.

Fig. 3 shows a transverse section through jointer A, rear view, together with a section of sod S S, and the manner in which the jointer acts in cutting the sod.

I disclaim the broad idea of a prairie-plow jointer.

Having described my invention, what I claim as new, and desire to secure by Letters Patent, is—

The semicircular colter for cutting loose a ribbon of turf from the land side of the furrow, being turned in the manner and for the purpose set forth and described.

ANDREW J. SPICER.

Witnesses:
R. F. JUDSON,
J. H. BOSTWICK.